United States Patent [19]

Oikawa et al.

[11] Patent Number: 5,017,715
[45] Date of Patent: May 21, 1991

[54] IODOTRIMETHYLSILANE COMPOSITIONS

[75] Inventors: Katsuyuki Oikawa, Kawasaki; Toshinobu Ishihara, Joetsu; Mikio Endo, Joetsu; Tohru Kubota, Joetsu, all of Japan

[73] Assignee: Shin-Etsu Chemical Co., Ltd., Tokyo, Japan

[21] Appl. No.: 523,878

[22] Filed: May 16, 1990

[30] Foreign Application Priority Data

May 17, 1989 [JP] Japan .................................. 1-123447

[51] Int. Cl.$^5$ .............................................. C07F 7/08
[52] U.S. Cl. .................................................. 556/401
[58] Field of Search ......................................... 556/401

[56] References Cited

U.S. PATENT DOCUMENTS 4,898,956  2/1990  Hilty .................................... 556/401

FOREIGN PATENT DOCUMENTS 0777100  6/1957  United Kingdom ................ 556/401

Primary Examiner—Paul F. Shaver
Attorney, Agent, or Firm—Birch, Stewart, Kolasch & Birch

[57] ABSTRACT

A composition comprising iodotrimethylsilane in admixture with a polysiloxane is shelf stable for a long time and effective in various organic synthetic reactions.

4 Claims, No Drawings

IODOTRIMETHYLSILANE COMPOSITIONS

This invention relates to an iodotrimethylsilane composition useful as a reagent for use in the synthesis of various organic compounds.

BACKGROUND OF THE INVENTION

In the organic synthesis chemistry, iodotrimethylsilane has been of great interest for its utility as a reagent for various organic synthetic reactions due to its oxygen affinity (see Akira Hosomi, Organic Synthesis Chemistry, 40, 545 (1982)). It was found, for example, that iodotrimethyl silane is effective in carbon-to-oxygen bond cleavage reaction of ethers and esters under neutral conditions, synthesis of olefins and sulfides through disoxidation reaction from ethylene oxide and sulfoxides utilizing oxygen affinity, and activation of a compound containing an oxygen functional group to induce a novel carbon-to-carbon bond generating reaction when used in a catalytic amount. It is presumed and expected that iodotrimethylsilane will find further applications to synthetic reactions in the chemical fields of saccharides, peptides and amino acids.

Although iodotrimethylsilane is easy to synthesize (see M. E. Jung and M. A. Lyster, J. Org. Chem., 42, 3761 (1977)), it is difficult to store for a long time. Since iodotrimethylsilane itself is highly sensitive to light and humidity, it tends to deteriorate by discoloring or creating high-boiling components during shelf storage, thus lowering its purity. The iodotrimethylsilane becomes inadequate for quantitative reaction after long-term shelf storage. It is thus impractical for synthetic reaction.

Iodotrimethylsilane must be improved in shelf stability before its utility can be expanded.

Therefore, an object of the present invention is to provide a novel and improved iodotrimethylsilane composition which ensures the shelf stability of iodotrimethylsilane.

SUMMARY OF THE INVENTION

The inventors have discovered that when iodotrimethyl silane is diluted with a polysiloxane of the general formula:

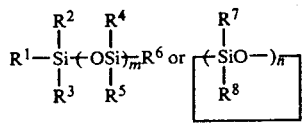

wherein $R^1$, $R^2$, $R^3$, $R^4$, $R^5$, $R^6$, $R^7$, and $R^8$ are independently selected from monovalent hydrocarbon groups having 1 to 6 carbon atoms, letter m is an integer of from 1 to 100, and n is an integer of from 3 to 100 to form a composition, the iodotrimethylsilane is quite stable in the composition during shelf storage.

In general, it is known in the art that a highly reactive compound can be improved in shelf stability by diluting it with a reaction inactive organic compound. Typical diluents are aliphatic and aromatic hydrocarbons such as hexane and toluene, ethers such as diethyl ether and tetrahydrofuran, and halohydrocarbons such as methylene chloride and carbon tetrachloride.

The inventors empirically found that when an aliphatic or aromatic hydrocarbon, for example, hexane is used as a diluent for iodotrimethylsilane, the mixture shows poor shelf stability as demonstrated by discoloring and a lowering of the purity of iodotrimethylsilane within 3 days of storage. When ethers and halohydrocarbons are used as a diluent for iodotrimethylsilane, cleavage and substitution reactions take place gradually as shown below.

Ethers:

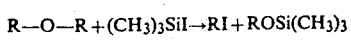

Halohydrocarbons:

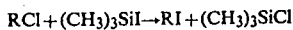

Therefore, the conventional organic solvents are inadequate as a diluent for iodotrimethylsilane.

Quite unexpectedly, when a polysiloxane as defined above is used as a diluent, the iodotrimethylsilane composition undergoes no noticeable change during storage for a long period of time in excess of one month. When hexamethyldisiloxane is used as a typical polysiloxane diluent, for example, the iodotrimethylsilane composition experienced no discoloration and remained chemically unchanged even after 90 days of shelf storage. In addition, the presence of the polysiloxane diluent does not adversely affect the reactivity of iodotrimethylsilane to be used as a reagent. Therefore, a composition comprising iodotrimethyl silane and a polysiloxane can be shelf stored for a long time, applicable to quantitative reaction using iodotrimethylsilane, and effective as a reagent for various organic synthetic reaction including dealkylation reaction, alkyl iodide synthesis reaction, and silylation of alcohols and ketones. The present invention is based on this finding.

Accordingly, the present invention provides an iodotrimethylsilane composition comprising iodotrimethylsilane in admixture with at least one member selected from polysiloxanes of the general formulae:

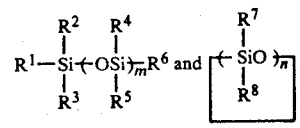

wherein $R^1$, $R^2$, $R^3$, $R^4$, $R^5$, $R^6$, $R^7$, and $R^8$ are independently selected from monovalent hydrocarbon groups having 1 to 6 carbon atoms, letter m is an integer of from 1 to 100, and n is an integer of from 3 to 100.

DETAILED DESCRIPTION OF THE INVENTION

The composition of the invention is defined as comprising iodotrimethylsilane and a polysiloxane.

The polysiloxane used herein is selected from polysiloxanes of the general formulae:

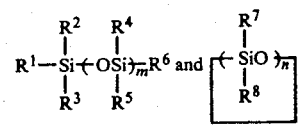

and mixtures thereof. In the formulae, $R^1$, $R^2$, $R^3$, $R^4$, $R^5$, $R^6$, $R^7$, and $R^8$, which may be the same or different, are independently selected from monovalent hydrocarbon groups having 1 to 6 carbon atoms, for example, alkyl groups such as methyl, ethyl, and propyl groups;

alkenyl groups such as vinyl and allyl groups; aryl groups such as phenyl and tolyl groups, with the methyl group being preferred. Letter m is an integer of from 1 to 100, preferably an integer of from 1 to 10, and n is an integer of from 3 to 100, preferably an integer of from 3 to 10.

Preferred examples of the polysiloxane are hexamethyldisiloxane and octamethylcyclotetrasiloxane.

The concentration of iodotrimethylsilane and polysiloxane in the composition may vary over a wide range although the composition preferably contains 70 to 30 mol % of iodotrimethylsilane and 30 to 70 mol % of polysiloxane.

The composition of the invention may be prepared by first synthesizing iodotrimethylsilane, for example, by the method of M. E. Jung and M. A. Lyster involving addition of iodine to a mixture of hexamethyldisiloxane and aluminum, and immediately thereafter, adding a polysiloxane to the iodotrimethylsilane in an inert gas atmosphere. Alternatively, if hexamethyldisiloxane is used as the polysiloxane, it is used in excess in the synthetic reaction such that it is left in the reaction system, resulting in a composition of iodotrimethylsilane in admixture with hexamethyldisiloxane.

The composition of the invention in which iodotrimethylsilane is diluted with a specific polysiloxane has the advantages that the composition ensures improved shelf stability of iodotrimethylsilane and can be directly and effectively used in various organic synthetic reactions at all times.

EXAMPLE

Examples of the invention are given below by way of illustration and not by way of limitation.

EXAMPLE 1

A 1-liter glass flask equipped with a stirrer, thermometer, reflux condenser, and dropping funnel was charged with 1.5 mol of hexamethyldisiloxane $(CH_3)_3SiOSi(CH_3)_3$ and 1.05 mol of powder aluminum. Then 1 mol of iodine $I_2$ was added dropwise at 60° to 80° C. over 2 hours. The flask contents were aged for further one hour. The reaction mixture was distilled to isolate a fraction at 102° to 111° C. There was obtained a composition of 50 mol % of iodotrimethylsilane and 50 mol % of hexamethyldisiloxane in a yield of 82 to 88%.

EXAMPLE 2

The reaction and work-up procedures of Example 1 were repeated except that 1 mol of hexamethyldisiloxane, 2.1 mol of powder aluminum, and 2 mol of iodine were used. There was obtained very pure iodotrimethylsilane having a purity of 99% or higher in a yield of 80 to 84%.

To the iodotrimethylsilane was added 2 mol of octamethylcyclotetrasiloxane of the following formula in an inert gas atmosphere. There was obtained a composition of 50 mol % of iodotrimethylsilane and 50 mol % of octamethylcyclotetrasiloxane.

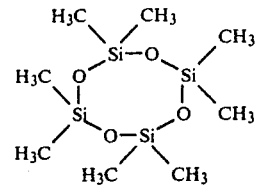

COMPARATIVE EXAMPLE

A similar composition containing 50 mol % of iodotrimethylsilane was obtained by adding 2 mol of hexane to the pure iodotrimethylsilane obtained in Example 2.

The iodotrimethylsilane compositions of Examples 1 and 2 and Comparative Example and a control sample in the form of pure iodotrimethylsilane having a purity of 99% or higher were evaluated for shelf stability by storing each in a glass container at room temperature (25° C.) with humidity and light shielded. In three days, the control sample or pure iodotrimethylsilane discolored and its analysis revealed the formation of high-boiling components and hexamethyldisiloxane. More decomposition occurred with the lapse of time.

The iodotrimethylsilane/hexane composition of Comparative Example appeared discolored in three days. Its analysis also revealed the formation of high-boiling components and hexamethyldisiloxane or a lowering of iodotrimethylsilane purity.

In contrast, the iodotrimethylsilane compositions of Examples 1 and 2 did not discolor or form a high-boiling component and remained unchanged in iodotrimethylsilane purity after 90 days of storage.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. An iodotrimethylsilane composition comprising iodotrimethylsilane in admixture with at least one member selected from polysiloxanes of the general formulae:

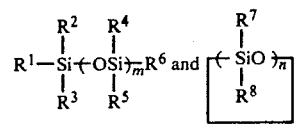

wherein $R^1$, $R^2$, $R^3$, $R^4$, $R^5$, $R^6$, $R^7$, and $R^8$ are independently selected from monovalent hydrocarbon groups having 1 to 6 carbon atoms, letter m is an integer of from 1 to 100, and n is an integer of from 3 to 100.

2. The composition of claim 1 wherein the polysiloxane is hexamethyldisiloxane.

3. The composition of claim 1 wherein the polysiloxane is octamethylcyclotetrasiloxane.

4. The composition of claim 1 which contains 70 to 30 mol % of the iodotrimethylsilane and 30 to 70 mol % of the polysiloxane.

* * * * *